(12) United States Patent
Dillon

(10) Patent No.: US 9,334,979 B2
(45) Date of Patent: May 10, 2016

(54) OIL DRAIN VALVE APPARATUS AND METHOD

(71) Applicant: Kevin Dillon, West Sand Lake, NY (US)

(72) Inventor: Kevin Dillon, West Sand Lake, NY (US)

( * ) Notice: Subject to any disclaimer, the term of this patent is extended or adjusted under 35 U.S.C. 154(b) by 29 days.

(21) Appl. No.: 14/513,593

(22) Filed: Oct. 14, 2014

(65) Prior Publication Data

US 2016/0102776 A1 Apr. 14, 2016

(51) Int. Cl.
| F16K 5/06 | (2006.01) |
| F16K 31/524 | (2006.01) |
| F16K 31/44 | (2006.01) |
| F01M 11/04 | (2006.01) |
| F16K 35/04 | (2006.01) |
| F16K 27/06 | (2006.01) |

(52) U.S. Cl.
CPC .......... *F16K 31/52458* (2013.01); *F01M 11/04* (2013.01); *F16K 5/06* (2013.01); *F16K 27/067* (2013.01); *F16K 31/445* (2013.01); *F16K 35/04* (2013.01)

(58) Field of Classification Search
CPC ... F16K 31/52458; F16K 5/06; F16K 31/445; F16K 35/04; F16K 27/067; F01M 11/04; F01M 11/0408; F01M 11/0458
USPC ............... 251/288, 340, 297, 315.01–315.16; 184/1.5
See application file for complete search history.

(56) References Cited

U.S. PATENT DOCUMENTS

| 133,215 | A | * | 11/1872 | Endicott ........... F16K 31/52408 |
| | | | | 251/257 |
| 2,991,090 | A | * | 7/1961 | De Cenzo ............... F16L 37/23 |
| | | | | 137/614.02 |
| 3,049,334 | A | * | 8/1962 | Montague .......... F01M 11/0408 |
| | | | | 184/1.5 |
| 3,677,369 | A | * | 7/1972 | Schramm ........... F01M 11/0408 |
| | | | | 184/1.5 |
| 3,703,250 | A | * | 11/1972 | Middleton .............. F16L 55/10 |
| | | | | 222/507 |
| 4,025,048 | A | | 5/1977 | Tibbitts |
| 4,745,894 | A | | 5/1988 | Laipply et al. |
| 4,807,847 | A | | 2/1989 | Martz |
| 5,086,522 | A | | 2/1992 | Stofko, Sr. |
| 5,368,181 | A | | 11/1994 | Myers |
| 5,400,840 | A | * | 3/1995 | Flaherty ............. F01M 11/0408 |
| | | | | 137/572 |
| 5,407,177 | A | * | 4/1995 | Lombardo ............ F16K 5/0647 |
| | | | | 184/1.5 |
| 5,411,115 | A | | 5/1995 | Shropshire |
| 5,431,588 | A | * | 7/1995 | Kucik ................ F01M 11/0408 |
| | | | | 210/DIG. 17 |
| 6,609,699 | B2 | | 8/2003 | Chen |
| 7,165,568 | B2 | * | 1/2007 | Kessell ................. F16K 5/0647 |
| | | | | 137/68.19 |
| 7,971,855 | B2 | * | 7/2011 | Burgess ................ F16K 5/0647 |
| | | | | 251/315.1 |
| 2008/0099080 | A1 | | 5/2008 | Saini et al. |

FOREIGN PATENT DOCUMENTS

KR 100370785 A 5/2002

\* cited by examiner

*Primary Examiner* — John Bastianelli
(74) *Attorney, Agent, or Firm* — Schmeiser, Olsen & Watts, LLP

(57) ABSTRACT

An oil drain valve including a ball valve having at least one valve opening that is exposed to an external environment through a housing, the ball valve including a drain opening for releasing oil through an opening of the housing. The housing is rotatable about the ball valve in a first rotational direction to move the ball valve from the open state to a closed state with respect to the housing. A method of draining oil from a vehicle including providing an oil drain valve having a housing and a ball valve, rotating a housing about a ball valve, opening the ball valve with respect to the housing, accepting oil into the housing through the ball valve, and releasing oil through a conduit at a bottom of the oil drain valve.

9 Claims, 7 Drawing Sheets

OIL DRAIN VALVE APPARATUS AND METHOD

FIELD OF TECHNOLOGY

The subject matter disclosed herein relates generally to oil drain valves. More particularly, the subject matter relates to an oil drain valve that provides for ease of opening and closing to allow oil to drain therefrom.

BACKGROUND

Oil drain valves for installation on tractor trailers and other motorized vehicles must typically be removed or opened in order to allow oil to be released from a crankcase or oil pan during an oil change. Prior art oil drain valves can be difficult to open and often require additional tools for doing so. Newer oil drain valves have been created which include levers for opening and closing the valve by hand. These levers are easy to actuate in order to change the oil drain valve from a closed state to an open state and vice versa. However, these levers are also exposed to the environment below the vehicle during driving conditions. It has been found that these levers can be hit by debris or other objects when a vehicle is driving down the road. Sometimes, contact made by debris will accidentally actuate the lever and open the oil drain valve, creating an oil leak in the vehicle. An oil leak that occurs while driving in this manner can be dangerous to the environment, and may even damage the vehicle if the leak is not discovered very quickly by an alert driver.

Thus, an oil drain valve that provides for ease of opening and closing that does not include an exposed lever would be well received in the art.

BRIEF DESCRIPTION

According to one embodiment, an oil drain valve comprises: an upper body having at least one upper body opening; a lower body attached to the upper body having a lower body drainage opening; and a ball valve located in the upper body having at least one valve opening that is alignable with the at least one upper body opening when the ball valve is in an open state, the ball valve including a drain opening which is connected to a conduit for releasing oil through the lower body drainage opening; wherein the lower body is rotatable about the upper body in a first rotational direction to move the ball valve from the open state to a closed state, and wherein the lower body is rotatable about the upper body in a second rotational direction opposite from the first rotational direction to move the ball valve from the closed state to the open state.

According to another embodiment, an oil drain valve comprises: a ball valve having at least one valve opening that is exposed to an external environment through a housing, the ball valve including a drain opening for releasing oil through an opening of the housing; wherein the housing is rotatable about the ball valve in a first rotational direction to move the ball valve from the open state to a closed state with respect to the housing.

According to another embodiment, a method of draining oil from a vehicle comprises: providing an oil drain valve having a housing and a ball valve; rotating a housing about a ball valve; opening the ball valve with respect to the housing; accepting oil into the housing through the ball valve; and releasing oil through a conduit at a bottom of the oil drain valve.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
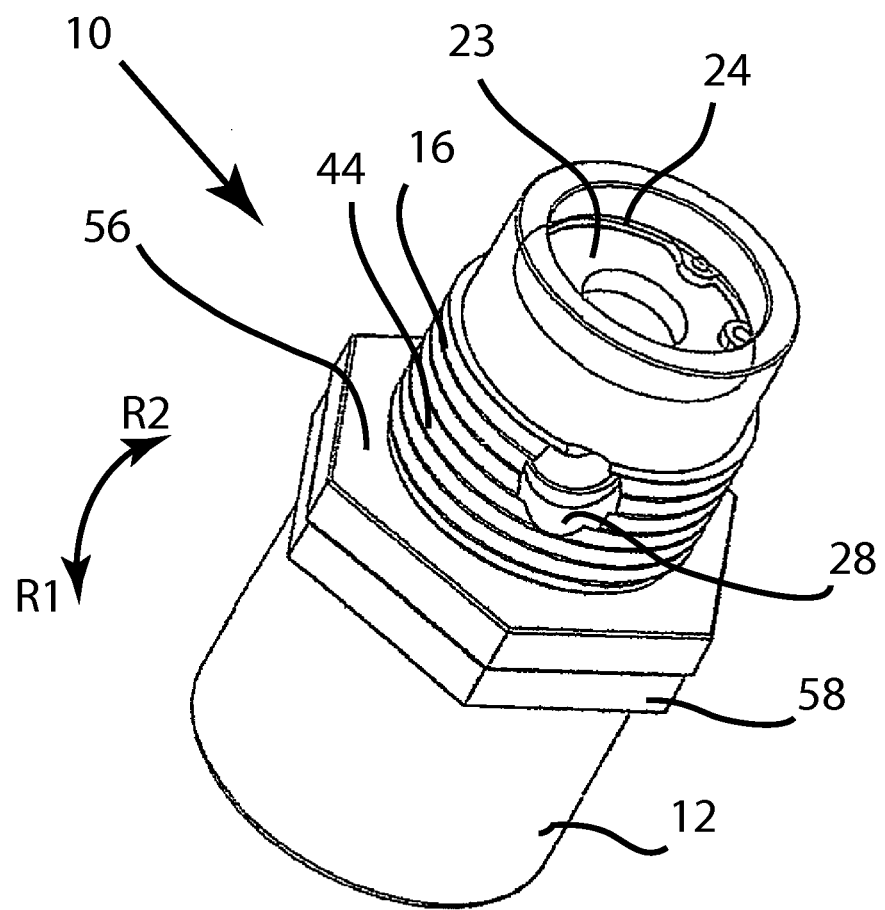
FIG. 1 depicts a perspective view of an oil drain valve in accordance with one embodiment.
Figure 2:
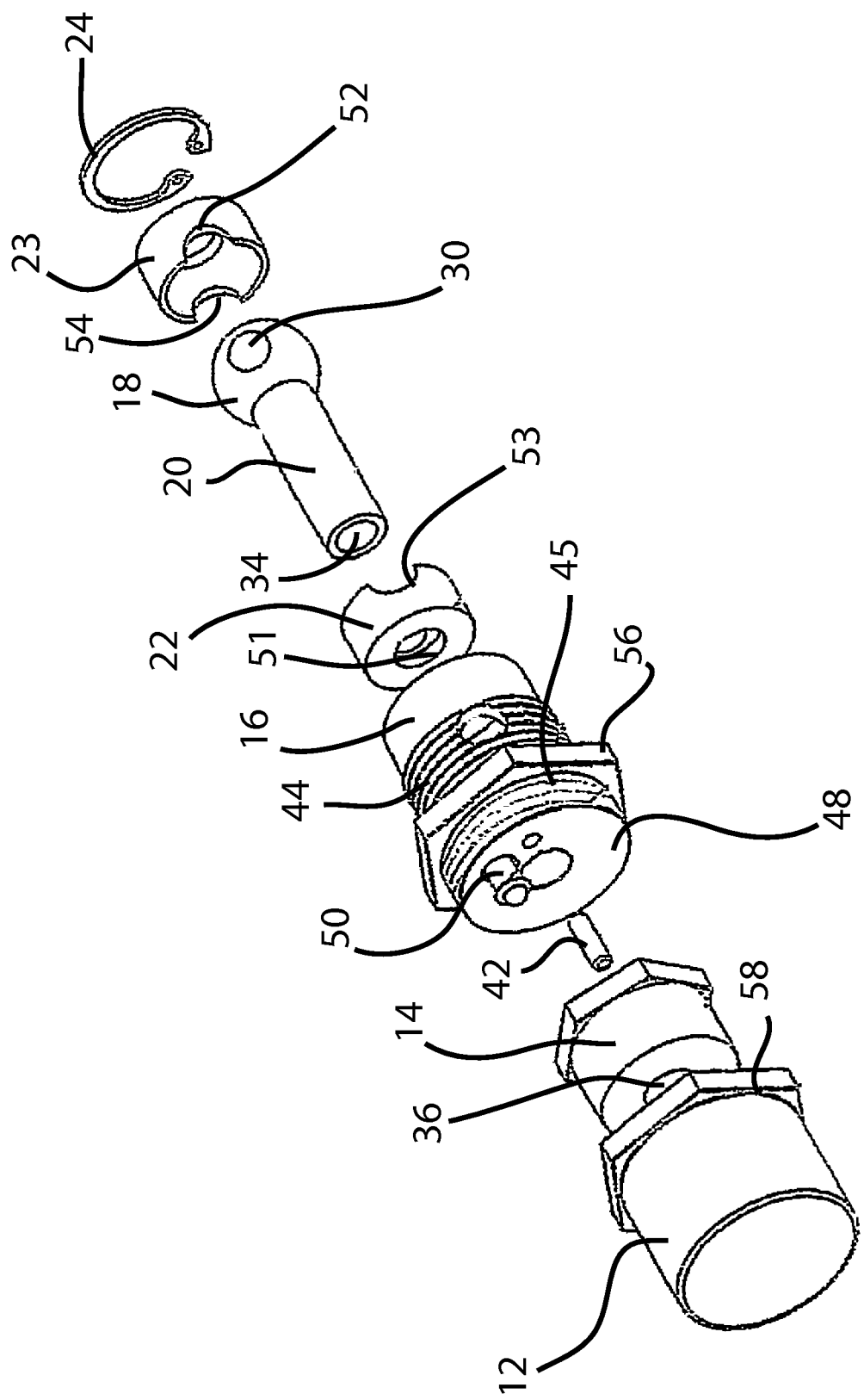
FIG. 2 depicts an exploded view of the oil drain valve of FIG. 1 in accordance with one embodiment.
Figure 3:
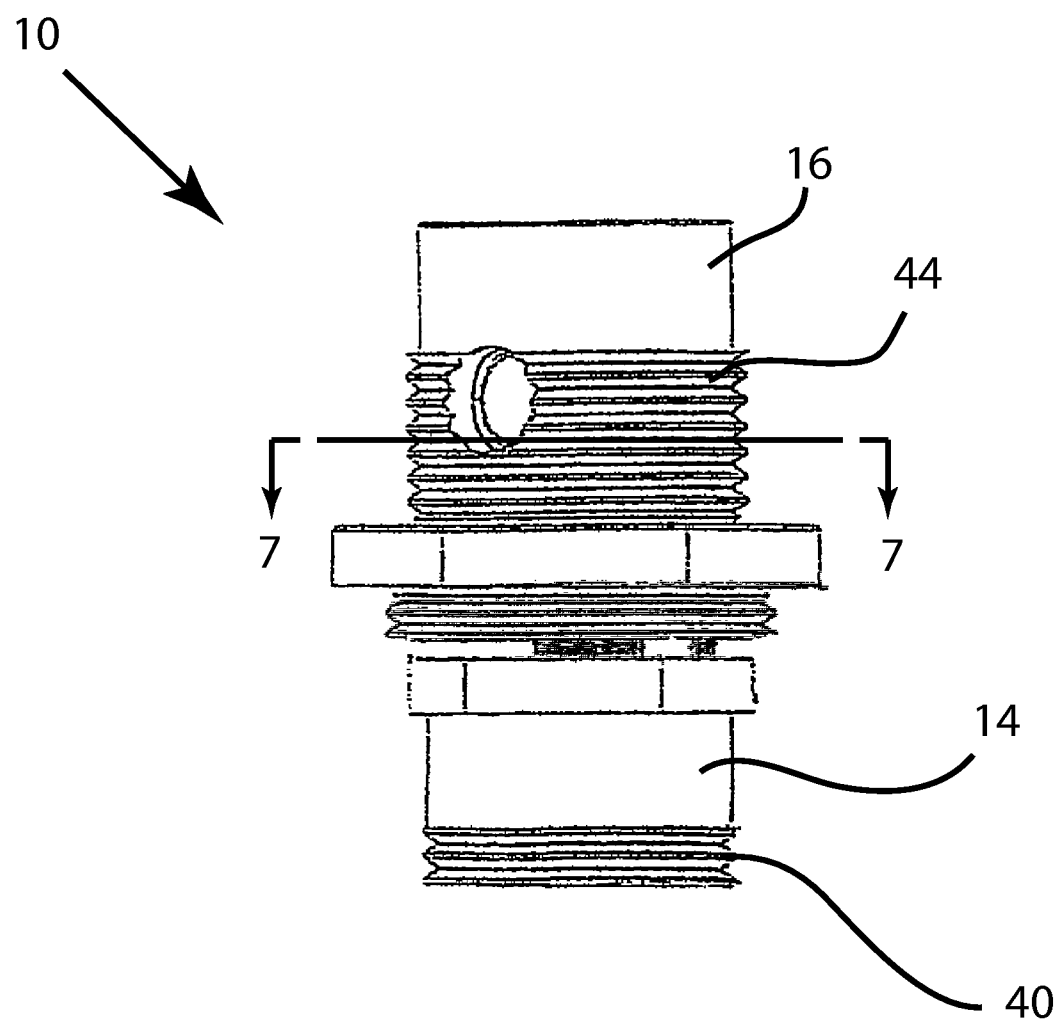
FIG. 3 depicts a side view of the oil drain valve of FIGS. 1 and 2 without a protective cap in accordance with one embodiment.
Figure 4:
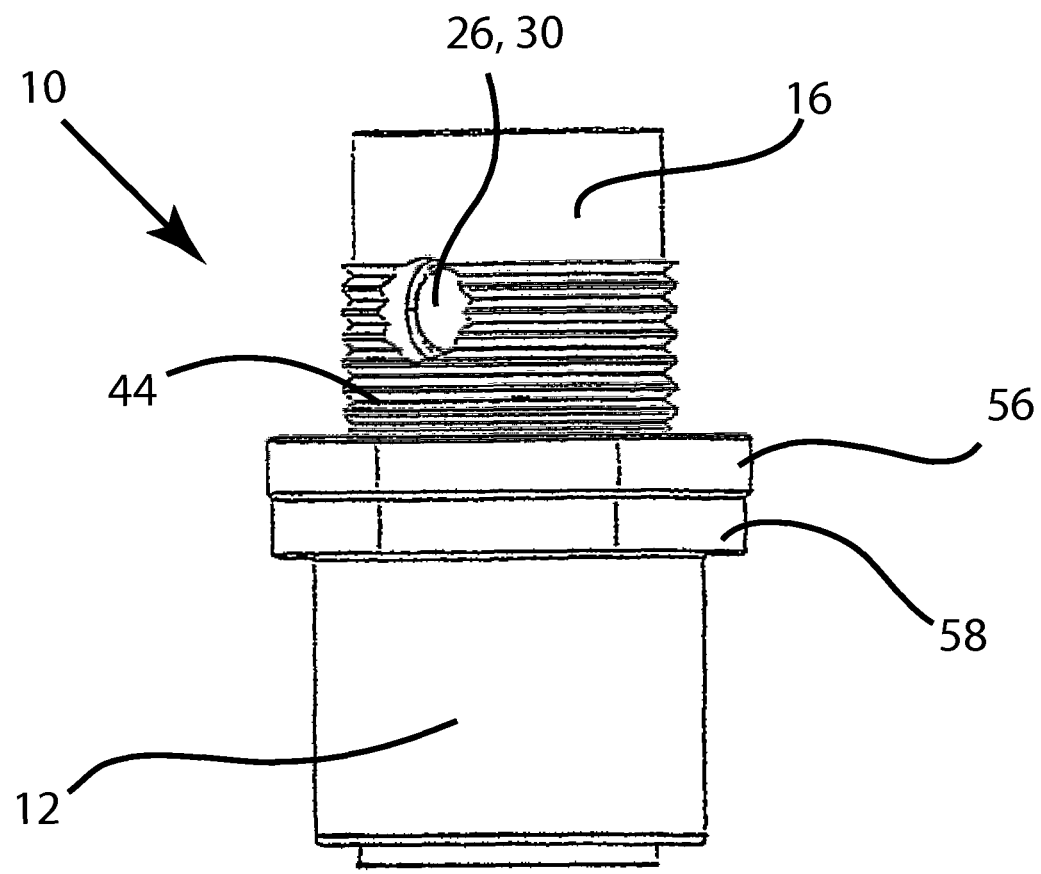
FIG. 4 depicts a side view of the oil drain valve of FIGS. 1-3 with the protective cap in accordance with one embodiment.

A detailed description of the hereinafter described embodiments of the disclosed apparatus and method are presented herein by way of exemplification and not limitation with reference to the Figures.

Referring to FIGS. 1-5, an oil drain valve 10 is shown in various views. The oil drain valve 10 includes a protective cap 12, a lower body 14, an upper body 16, a ball valve 18 connected to a conduit 20, a lower bushing 22, an upper bushing 23, and a snap ring 24. The upper body 16 includes two upper body openings 26, 28 which are alignable with two valve openings 30, 32 in the ball valve 18 when the ball valve 18 is in an open state. The ball valve 18 further includes a drain opening 34 connected to the conduit 20 for releasing oil into and/or out of the lower body 14 through a lower body drainage opening 36. The ball valve 18 may be, for example, a three hole steel ball valve that includes the two horizontal openings 30, 32 and the one downward vertical opening 36. The upper body 16 may be attachable to an oil pan (not shown) such that the two upper body 16 and the upper body openings 26, 28 extend into the oil pan and are exposed to oil within the bottom of the oil pan.

Figure 5:
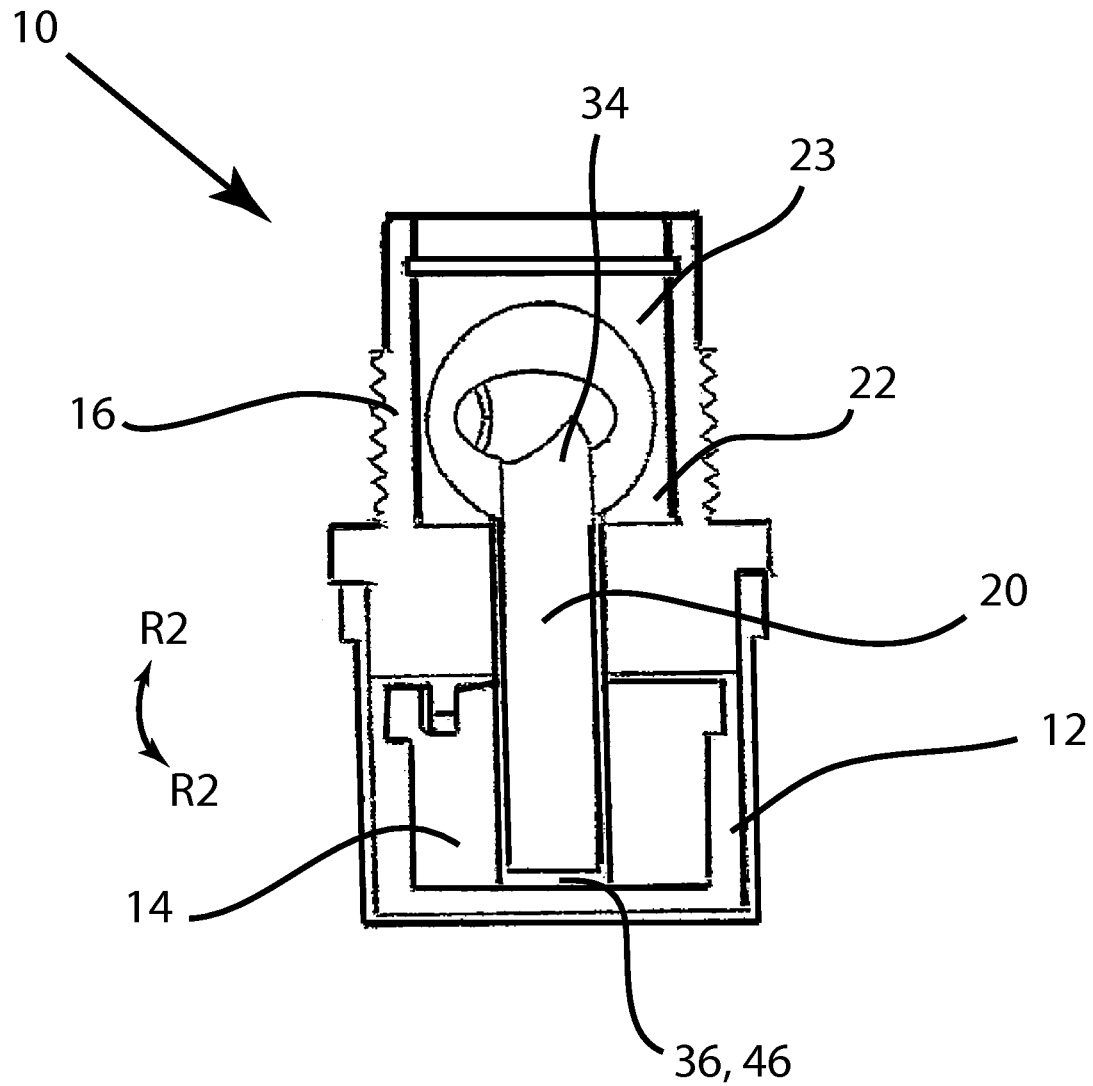
FIG. 5 depicts a cross sectional view of the oil drain valve of FIGS. 1-4 in an open state in accordance with one embodiment.
Figure 6:
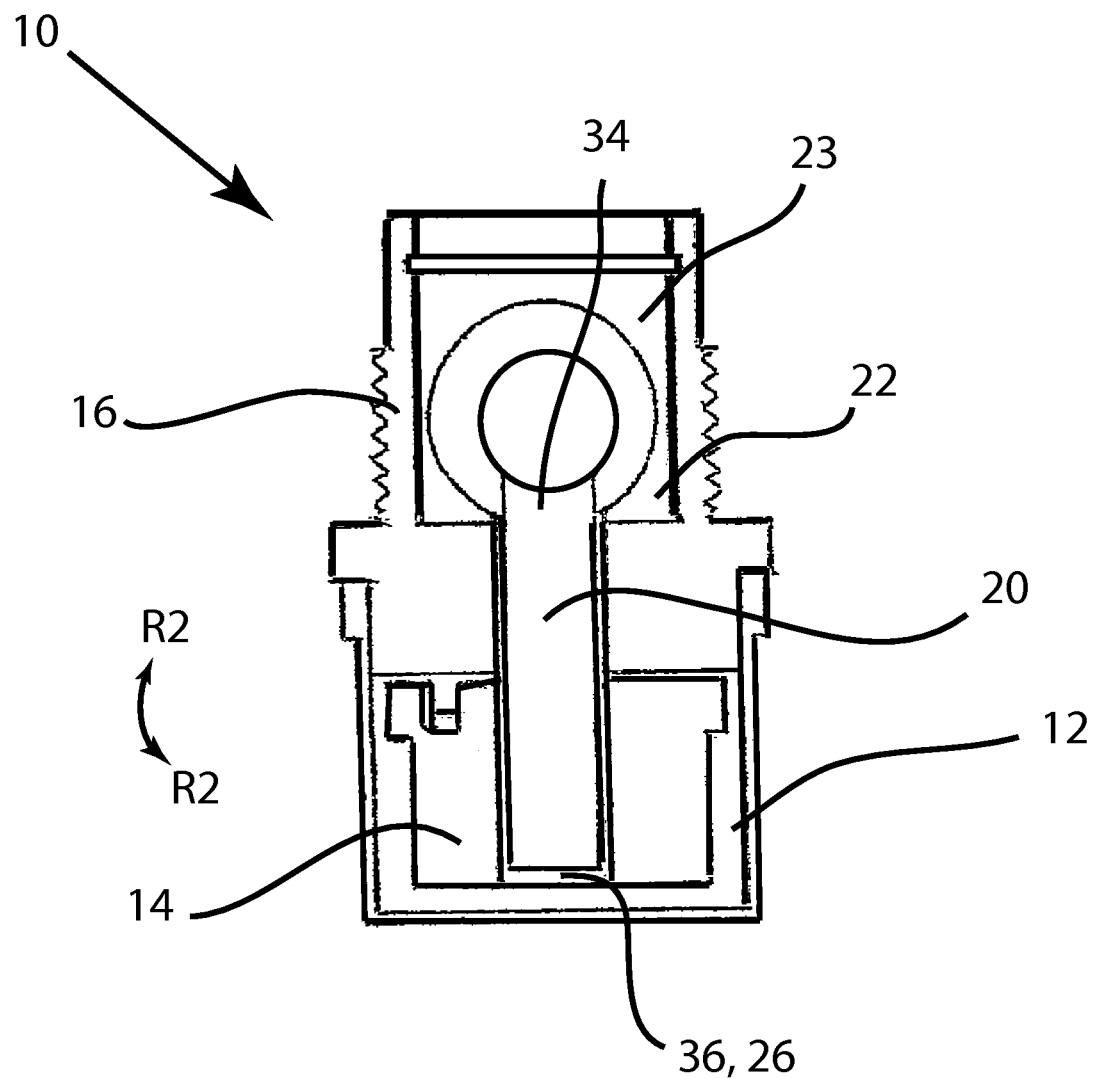
FIG. 6 depicts a cross sectional view of the oil drain valve of FIGS. 1-5 in a closed state in accordance with one embodiment.
Figure 7:
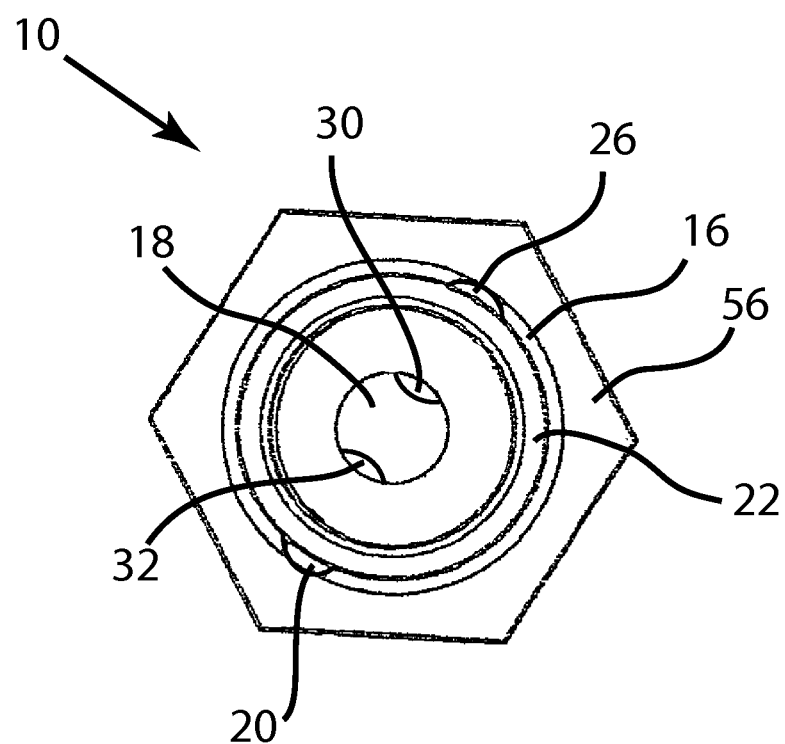
FIG. 7 depicts a top cutaway view of the oil drain valve of FIGS. 1-6 taken at arrows 7-7 in accordance with one embodiment.

The lower body 14 may be rotatable about the upper body 16 in a first rotational direction R1 to move the ball valve 18 from the open state, as shown in FIG. 5, to a closed state, as shown in FIG. 6. The lower body 14 may be rotatable about the upper body 16 in a second rotational direction R2 opposite from the first rotational direction R1 to move the ball valve 18 from the closed state to the open state. In the open state, the oil from the oil pan is configured to enter into the oil drain valve 10 through the upper body openings 26, 28, and proceed to flow into the ball valve 18 through the valve openings 30, 32. From there, the oil drains out the drain opening 34 of the ball valve 18 and into the conduit 20. From there, the oil exits the oil drain valve from a conduit opening 38 at the bottom of the conduit 20 and the lower body drainage opening 36. The oil may continue to flow out of the oil pan in this manner until the lower body 14 is rotated in the first rotational direction R1 to close the oil drain valve 10.

The lower body 14 and the upper body 16 may be casings which are vertically connected to one another, respectively, by the conduit 20. The conduit 20 may be connected, via a permanent press, for example, to the ball valve 18 such that the bottom opening (not shown) of the ball valve 18 is aligned with the conduit 20. It should be understood that the conduit 20 could be referred to as a drain tube, channel, opening, tube, or the like. The upper body 16 may include a cup-like shape. With the two openings 26, 28 in the side of the cup-like shape, and an opening in the bottom of the cup-like shape (not shown) which allows the conduit 20, after being attached to the ball valve 18, to extend therethrough. The upper body 16 may be internally machined to accept the ball valve 18. Thus, to assemble the oil drain valve 10, the conduit 20 may be fit through the bottom opening of the upper body 16 to extend through and into the lower body drainage opening 36 of the lower body 14. The conduit 20 may be permanently pressed into the lower body drainage opening 36 creating an internal drain.

The two upper body openings 26, 28 may be disposed on opposite sides of the upper body 16. The valve openings 30, 32 may be similarly located on opposite sides of the ball valve 18. The valve openings 30, 32 may be alignable with the two upper body openings 26, 28 when the ball valve 18 is in an open state, as shown in FIG. 5. In other embodiment, the upper body 16 and the ball valve 18 may each include a single opening, rather than the two 26, 28, 30, 32 each as shown. Alternately, three or more openings are contemplated. The additional openings in the ball valve 18 may be configured to allow more oil to flow through the valve more quickly. Alternately, the size of the openings can be increased or decreased to accommodate faster or slower oil flow depending on the desired flow rate. Whatever the embodiment, the outer circumference of the ball valve 18 in the plane of the openings 30, 32 must include an equal or greater percentage of the perimeter as a solid outer wall without an opening. This ensures that the ball valve 18 may enter a fully closed state when rotated into the closed position as shown in FIG. 6.

In order to provide for the rotation of the ball valve 18 with respect to the upper body 16 when the lower body 14 is rotated, the ball valve 18 may be operably connected to the lower body 14. In the embodiment shown, the conduit 20 extending from the bottom of the ball valve 18 may be connected to the lower body 14. Thus, the lower body 14 may be bored to include a center opening, hole, bore or channel 46 that extends axially along its entire length within the center of the lower body 14. Thus, the channel 46 may extend fully through the axial length of the lower body 14. The channel 46 may include a circular cross section. The channel 46 may extend from the lower body drainage opening 36 to the top of the lower body 14 proximate the ball valve 18. The conduit 20 attached to the ball valve 18 may also be attached to this channel 46. In one embodiment, the conduit 20 may be welded within the center opening 46 of the lower body 14. Whatever the attachment mechanism, when the lower body 14 is rotated, it automatically exacts rotation on the ball valve 18.

In another embodiment, the conduit 20 may not be included at all and instead the ball valve 18 may simply be directly attached to the top of the lower body 14. Thus, the ball valve 18 may expel oil from the drain opening 34 and into the channel 46 of the lower body 14. This channel 46 may thus replace the conduit 20. Whatever the embodiment, when the lower body 14 is rotated with respect to the upper body 16, the ball valve 18 may be configured to rotate. This may provide for the opening and closing of the openings 26, 28, 30, 32 of the upper body 16 and the ball valve 18, respectively. Moreover, the size of the conduit 20 and/or channel 46 may be expanded or decreased with respect to the embodiment shown to allow oil to drain more or less quickly.

The lower bushing 22 and the upper bushing 23 may surround the ball valve 18 within the upper body 16. The lower bushing 22 and the upper bushing 23 may, for example, be made from nylon or plastic. Other materials, such as metal, steel or the like, are contemplated. The lower bushing 22 and the upper bushing 23 may be configured to tightly surround the ball valve 18 and prevent fluid from escaping from the ball valve 18 other than through the openings 30, 32 and the drain opening 34. As explained hereinabove, the upper body 16 may not be enclosed at the top at a location above where the ball valve 18 resides. To fashion the ball valve 18 within the upper body 16, the upper body 16 may include the cup-like cavity cavity which is larger than the ball valve 18. Prior to placing the ball valve 18 and conduit 20 into the upper body 16, the lower bushing 22 may first be placed into the cup-like opening of the upper body 16 with two horizontal openings 51, 53 aligned with the openings 26, 28 of the upper body. The upper bushing 23 may act as a cap of the upper body 16 having two horizontal openings 52, 54 aligned with the openings 26, 28 of the upper body 16. It should be understood that the openings 51-54 may be milled into the bushings 22, 23. In this embodiment, the upper bushing 23 may actually be threadably engageable with internal threads (not shown) the upper body 16. In other embodiments, the upper bushing 23 may be press fit into the upper body 16. In this manner, the upper bushing 23 cap may be attached to the top of the upper body 16 after the ball valve 18 has been inserted therein. In other embodiments, no bushings 22, 23 may be used. Instead, the upper body 16 may tightly surround the ball valve 18 on both the upper and lower halves of the ball valve 18. In the embodiment shown, the snap ring 24 may be placed above the upper bushing 23 within the cup-like opening of the upper body 16 to further retain the upper bushing 23 within the upper body 16.

In yet other embodiments, a single bushing may be used rather than the two bushing 22, 23. For example, the oil drain valve 10 may include the lower bushing 22 but not the upper bushing 23. In this embodiment, the upper portion of an inner cavity of the upper body 16 may be curved in the shape of the ball valve 18 to tightly surround the upper half of the ball valve 18, while the lower half of the ball valve 18 may be tightly surrounded by a lower bushing 22 that is fit into the upper body 16. In this embodiment, the assembly of the oil drain valve 10 may include providing the upper body 16, placing the ball valve 18 into the cavity of the upper body 16 with the conduit 20 extending out of the bottom of the upper body 16. Next, the lower bushing 22 may be placed into the conduit 20. This assembly may be held into place when the lower body 14 is attached to the upper body 16 by the press fitting of the conduit 20 with the lower body drainage opening 36 of the lower body 14.

A user may replace a standard oil drain with the oil drain 10. Alternatively, the oil drain valve 10 may come standard in a vehicle. Once the upper body 16 is attached to the oil pan, a user may rotate the lower body 14 while the upper body 16 remains stationary and attached to the oil pan. Rotating the lower body 14 with respect to the upper body 16 in this manner may open the ball valve 18 and allow oil to drain through the valve 10 from the openings 26, 28, 30, 32 in the oil pan and out of the bottom of the valve 10. The lower body 14 may have a threaded outer wall 40. The threaded outer wall 40 may be dimensioned to receive a standard garden hose (not shown). The garden hose may be attachable to the lower body 14 to allow a user to drain oil from the oil pan and into a bucket more conveniently, rather than require a bucket to be placed directly under the oil drain valve 10.

The protective cap 12 may be configured to cover the lower body drainage opening 36 in the lower body 14. This protective cap 12 may be screwed into the lower body 14 after the oil drain valve 10 is used to drain oil. The upper body may include external lower threads 45 which may threadably engage with internal female threads (not shown) found in the protective cap 12. In other embodiments, the protective cap 12 may slide onto the lower body 14 via an interference fit. The protective cap 12 may replace a garden hose, for example, after use. This protective cap 12 may protect from unwanted drainage just in case the lower body 14 is rotated with respect to the upper body 16 in an unintentional manner. Moreover, the protective cap 12 may be magnetic so that it is easily attachable to metallic components to prevent it from becoming lost when a user is using the oil drain valve 10 to drain oil.

Similar to the lower body 14, the upper body 16 may also include a threaded outer wall 44 that is configured to be screwed into an oil pan of a vehicle (not shown). As described hereinabove, at least a portion of the upper body openings 26, 28 are exposed in the oil pan when the oil drain valve 10 is screwed into the oil pan. In one embodiment, the entirety of the openings 26, 28 may be found within the oil pan when the outer wall 44 is screwed fully into the bottom of the oil pan of a vehicle.

The oil drain valve 10 may further include a limiting pin 42. The limiting pin 42 may be located within the upper and lower bodies 14, 16 and may be configured to prevent rotation of the lower body 14 about the upper body 16 beyond a predetermined amount of rotation. In one embodiment, the limiting pin 42 may prevent the rotation of the lower body 14 about the upper body 16 in the first rotational direction R1. In another embodiment, the limiting pin 42 may prevent the rotation of the lower body about the upper body 16 in the second rotational direction R2. Whatever direction the limiting pin 42 prevents rotation of the lower body 14 about the upper body 16, the opposite direction may be prevented from rotation beyond a second set point. This second limit may be provided by the tightening of the threads of the upper body 16 an lower body 14 until an upper circumference portion 60 of the lower body 14 and a lower circumference portion 62 of the upper body 16. The limiting pin 42 may be affixed, in one embodiment, to a bottom surface 48 of the upper body 16. The limiting pin 42 may be configured to ride within a milled guide (not shown) cut into an upper surface of the lower body 14. In one embodiment, the limiting pin 42 may be configured to restrict movement of the lower body 14 with respect to the upper body 16 to a quarter turn. In another embodiment, the milled surface of the lower body 14 may prevent more or less rotation. Whatever the embodiment, this rotation may open and close the openings 26, 28, 30, 32 of the ball valve 18 and the upper body 16.

The lower body 14 and upper body 16 may releasably lock together when the ball valve 18 is in the closed state, as shown in FIG. 6. The closed state may require additional force to release the lower body 14 from the upper body 16 relative to the force required to rotate the lower body 14 about the upper body 16 once released from the closed state. In one embodiment, the lower body 14 may be held in position, when in the closed position, by a spring loaded ball check assembly 50 that may be press mounted, for example, into a pre drilled hole (note shown) in the bottom surface 48 of the upper body 16. The spring loaded ball check assembly 50 may aligned with the pre-drilled hole when the oil drain valve 10 is in a closed position and may be forced, by a spring, into the pre-drilled hole in this state. However, the rotational opening force on the lower body 14 with respect to the upper body 16 may dislodge the spring loaded ball check assembly 50 from the pre-drilled hole and allow for further rotation of the lower body 14 with respect to the upper body 16 to open the openings 26, 28, 30, 32 of the ball valve 18 and the upper body 16.

The upper body 16 may include a hexagonal outer circumference 56. The hexagonal outer circumference 56 may extend radially from the rest of the outer circumference of the upper body 16. The hexagonal outer circumference 56 may, in other embodiments, be circular, or shaped in other manners. However, the radial extension from the rest of the outer circumference of the outer body 16 may prevent the upper body 16 from being screwed into the bottom of the oil pan past the certain point. In other words, the hexagonal outer circumference 56 may act as a stop when attaching the oil drain valve 10 to the oil pan. Likewise, the lower body 14 may include a second hexagonal outer circumference 58. This may be used, in combination with the limiting pin 42, to prevent rotation of the lower body 14 about the upper body 16 past a certain point.

In yet another embodiment, a method is contemplated. The method may include draining oil from a vehicle (not shown). The method may first include providing an oil drain valve, such as the oil drain valve 100, having a housing, such as the lower body 14 and the upper body 16, and a ball valve, such as the ball valve 14. The method may include rotating the housing about the ball valve. The method may include opening the ball valve with respect to the housing, and accepting oil into the housing through the ball valve. The method may further include releasing oil from a conduit, such as the conduit 20, at a bottom of the oil drain valve.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, it should be understood that the present invention may include any combination of the components, hierarchy and methodology described herein.

What is claimed is:

1. An oil drain valve comprising:
    an upper body having at least one upper body opening;
    a lower body attached to the upper body having a lower body drainage opening; and
    a ball valve located in the upper body having at least one valve opening that is alignable with the at least one upper body opening when the ball valve is in an open state, the ball valve including a drain opening which is connected to a conduit for releasing oil through the lower body drainage opening;

wherein the lower body is rotatable about the upper body in a first rotational direction to move the ball valve from the open state to a closed state, and wherein the lower body is rotatable about the upper body in a second rotational direction opposite from the first rotational direction to move the ball valve from the closed state to the open state.

2. The oil drain valve of claim 1, further comprising at least one bushing surrounding the ball valve in the upper body.

3. The oil drain valve of claim 1, further comprising a protective cap configured to cover the lower body drainage opening in the lower body.

4. The oil drain valve of claim 1, wherein an outer wall of the lower body is threaded and is configured to receive a standard garden hose.

5. The oil drain valve of claim 1, further comprising a limiting pin configured to prevent rotation of the lower body about the upper body beyond a predetermined amount of rotation.

6. The oil drain valve of claim 1, wherein an outer wall of the upper body is threaded and configured to be screwed into an oil pan of a vehicle.

7. The oil drain valve of claim 6, wherein at least a portion of the at least one upper body opening is exposed in the oil pan when the oil drain valve is screwed into the oil pan.

8. The oil drain valve of claim 1, wherein the upper body includes two upper body openings disposed on opposite sides of the upper body, and wherein the ball valve includes two valve openings that are alignable with the two upper body openings when the ball valve is in an open state.

9. The oil drain valve of claim 1, wherein the lower body and upper body releasably lock together when the ball valve is in the closed state, and wherein the closed state requires additional force to release the lower body from the upper body relative to the force required to rotate the lower body about the upper body once released.

\* \* \* \* \*